Oct. 24, 1967  R. J. SHAEFFER  3,348,428

REMOTE CONTROL ASSEMBLY

Filed April 9, 1965

INVENTOR.
Robert J. Shaeffer
BY
Barnard, McGlynn & Reising
ATTORNEYS

United States Patent Office 3,348,428
Patented Oct. 24, 1967

3,348,428
REMOTE CONTROL ASSEMBLY
Robert J. Shaeffer, Skippack, Pa., assignor to Teleflex Incorporated, North Wales, Pa., a corporation of Delaware
Filed Apr. 9, 1965, Ser. No. 447,029
17 Claims. (Cl. 74—502)

ABSTRACT OF THE DISCLOSURE

A remote control assembly and, more particularly, to a guide for a remote control assembly having a bore therethrough for movably supporting a motion transmitting core element wherein the guide has a resilient membrane formed integrally therewith so as to extend into the bore to bear against the core element so that the core element is held against movement between the bore and the resilient membrane until a predetermined force is applied to the core element to move the core element.

More specifically, this invention relates to an improvement upon the invention set forth in application Ser. No. 446,966, filed Apr. 9, 1965, in the name of Thomas E. Wilkey and assigned to the assignee of the present invention.

Remote control assemblies of the instant type heretofore utilized typically comprise a guide having a flexible conduit secured to an end fitting which is adapted to be attached to a support with a motion transmitting core element movably disposed within the conduit and the end fitting. One end of the motion transmitting core element is adapted to be connected to an element to be controlled while the other end has a knob, or the like, attached thereto for moving the core element relative to the guide. The core element may be disposed for rotary movement within the guide or may be disposed for push-pull movement along the bore of the guide.

Such remote control assemblies are variously utilized in marine, automotive and aircraft vehicles. For example, such remote control assemblies are typically utilized in automobiles to operate hood latches and air vent controls. For instance, the guide comprising a conduit and an end fitting may be secured to the support structure of an automobile such that one end of the core element is attached to a vent control while the other end of the core element is disposed in the instrument panel so that it may be manually accessible from the front seat of the automobile in order that the position of the vent control may be changed to control the amount of air flowing into the automobile.

Often the element being controlled, such as a vent in an automobile, is designed to maintain the position to which it is moved by friction. Frequently, however, the element to be controlled, due to wear and the like, does not retain sufficient inherent frictional forces to maintain itself in a position to which it has been moved by a control assembly. That is to say, a vent control in an automobile may be moved to a given position by the control assembly yet air flowing past the vent control may be sufficient to move the vent control due to the fact that the vent control does not have sufficient inherent frictional resistance against movement to sustain itself in the position to which it has been moved by the control assembly.

A solution to this problem is to fabricate the remote control assembly such that there is a proper amount of frictional resistance to the movement of the core element within the conduit and the end fitting. However, in order to fabricate a remote control assembly which provides the desired degree of frictional resistance to the movement of the core element within the conduit and the end fitting, the tolerances which must be maintained in the manufacture of the conduit and the end fitting are critical and cannot be consistently maintained in the manufacturing process if the control assembly is to be made at a commercially feasible cost.

In addition to the desirability to have a predetermined amount of frictional resistance to the movement of the core element within the guide comprising the conduit and the end fitting to retain the element to be controlled in a particular position, there are other environments in which it is desirable to have a predetermined amount of frictional resistance to the movement of the core element. For example, there are many situations wherein it is desirable to have a remote control assembly of the instant type provide a resistance to the movement of the core element so that upon manual movement thereof, the operator may firmly and precisely manually operate the control assembly. In contradistinction, if there is no resistance to the movement of the core element within the guide, the slightest contact by the operator with the core element will tend to move the core element a great distance very quickly. Therefore, some resistance to the movement of the core element provides a remote control assembly which may be utilized for precise control of the element to be controlled.

Accordingly, it is an object and feature of this invention to provide a remote control assembly which is simply and economically manufactured and possesses a predetermined amount of frictional resistance to the movement of the core element movably supported within the guide of the assembly.

Another object and feature of the present invention is to provide an improved remote control assembly having a guide adapted to support a movable motion transmitting core element with a friction means formed integrally with the guide to provide a predetermined frictional resistance to the movement of the core element relative to the guide.

In general, these and other objects of this invention are attained by a remote control assembly including a guide comprising a flexible conduit and an end fitting attached thereto with a bore extending therethrough. A core element is movably disposed in the bore through the conduit and the end fitting. The end fitting is formed so as to have a thin resilient membrane forming a portion of the wall of the bore therethrough and extending into the bore. The resilient membrane extends into the bore to provide a predetermined amount of resistance to the movement of the core element by bearing against the core element so that the core element is held against movement between the bore and the membrane until a predetermined force is applied to the core element to move it relative to the conduit and the end fitting. The membrane is resilient or flexible so as to bear against the movable core element with a substantially constant force.

Other objects and attendant advantages of this invention will be readily appreciated as the same becomes better understood by reference to the following detailed description when considered in connection with the accompanying drawings wherein.

Figure 1:
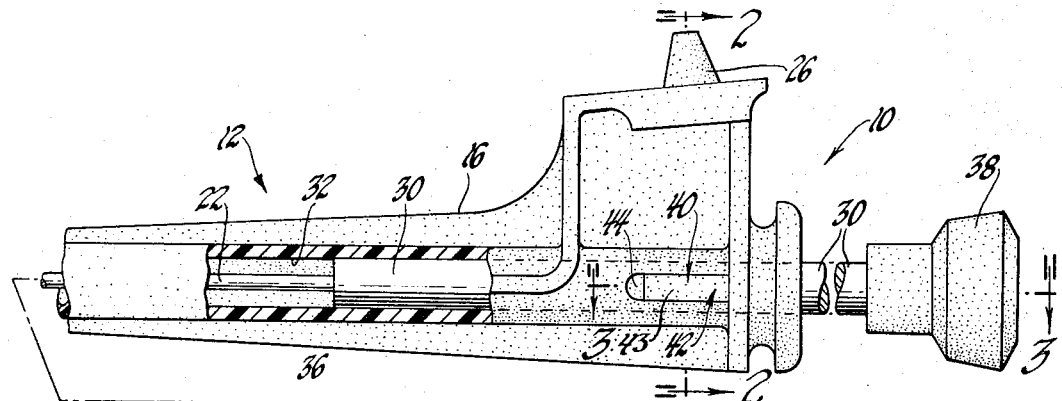
FIGURE 1 is a side elevational view partially in cross section of a preferred embodiment of the remote control assembly of the instant invention.
Figure 1:
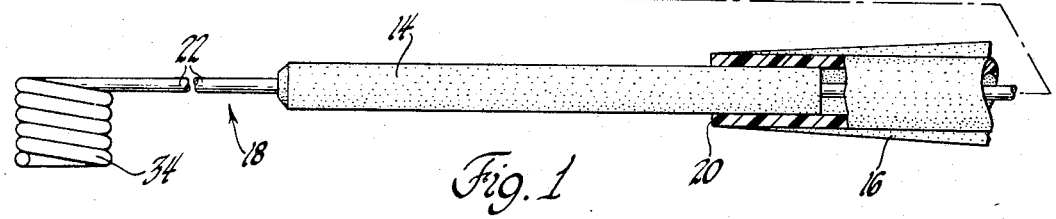

Referring now to the drawings, wherein like reference numerals indicate like or corresponding parts throughout the several views, there is shown, generally at 10, a remote control assembly including a guide, generally shown at 12, which includes a flexible conduit 14 and an end fitting 16 for movably supporting a motion transmitting core element, generally shown at 18.

The flexible conduit 14 is attached to the end fitting 16 at 20 by an appropriate bond, such as by bonding a plastic end fitting 16 to a plastic conduit 14. The guide 12, comprising the end fitting 16 and the flexible conduit 14, has a bore therethrough in which is disposed the movable core element 18. The motion transmitting core element 18 includes a wire-like rod 22 and a bar 30.

The end fitting 16 is adapted to be attached to a support structure by way of the flat surface 24, protrusion or flange 26, and the hole 28. Bolts, screws, or the like, may be inserted through the holes 28 and attached to a support structure such as the instrument panel of an automobile. The end fitting 16 has a bore 32 extending therethrough. It is to be understood that although a substantially circular shaped bore is illustrated, any shape bore may be utilized with a bar element 30 of a shape to match the shape of the bore 32.

The motion transmitting core element 18 has a first end 34 which extends from the flexible conduit 14 and has a means comprising an eyelet for attachment to an element to be controlled such as a vent in an automobile. The core element 18, on the other end, extends within the end fitting 16 and includes the bar 30. The bar is attached to the wire-like rod 22 of the core element 18 at 36 by swaging, welding, or the like. The bar 30 is slidably supported in the bore 32 of the end fitting 16.

A knob 38, or the like, is attached to the end of the bar 30 so that the core element 18 may be moved within the guide 12 comprising the flexible conduit 14 and the end fitting 16.

The end fitting 16 has a friction means 40 formed integrally therewith to provide a predetermined frictional resistance to the movement of the core element 18 within the guide 12.

Figure 2:
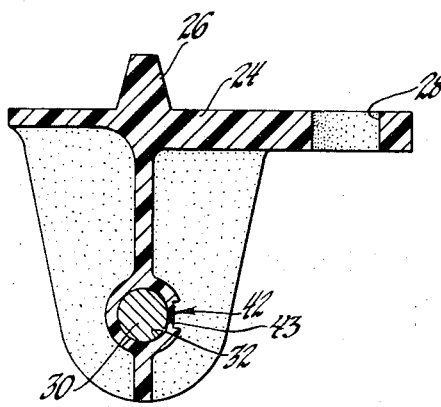
FIGURE 2 is a cross-sectional view taken along line 2—2 of FIGURE 1.
Figure 3:
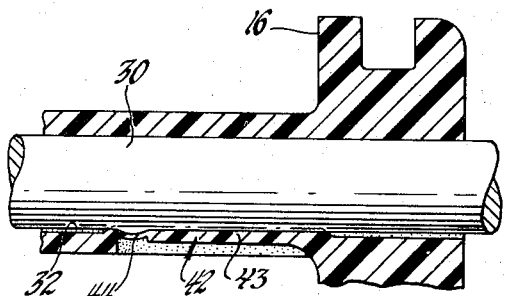
FIGURE 3 is an enlarged fragmentary view in cross section taken along line 3—3 of FIGURE 1.
Figure 4:
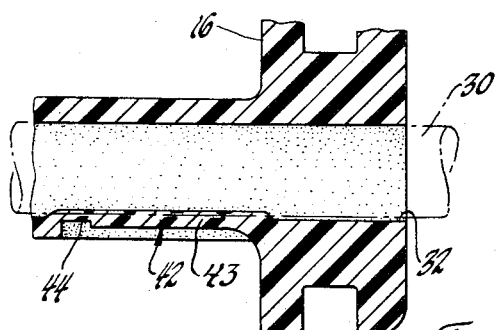
FIGURE 4 is an enlarged fragmentary view in cross section similar to FIGURE 3 showing the position of the resilient membrane without the movable core element inserted within the bore of the guide.
Figure 5:
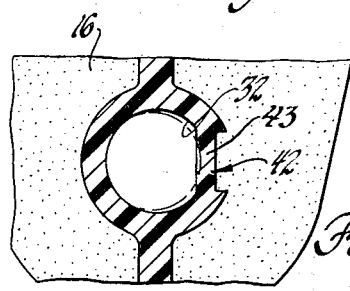
FIGURE 5 is an enlarged fragmentary view in cross section showing the position of the resilient membrane without the core element disposed in the bore of the guide.

The friction means 40 is a resilient membrane 42 which is formed integrally with and of the same material as the end fitting 16. As is more clearly shown in FIGURES 2 and 3, the resilient membrane 42 extends into the bore 32 to bear against the bar 30 of the core element 18 to hold the bar 30 against movement between the upper portion of the bore 32 and the resilient membrane 42 until a predetermined force is applied to the knob 38 to move the core element 18. However, when the bar 30 of the core element 18 is not disposed in the bore 32, the resilient membrane 42 extends farther into the bore 32, as shown in FIGURES 4 and 5.

The resilient membrane 42 has a first thickness along a first portion 43 thereof and has a second thickness along the remaining second portion 44. The second portion 44 has a thickness which is less than the thickness of the first portion 43 of the resilient membrane 42. The second portion 44 of the membrane 42 allows the membrane portion 43 to bear against the bar 30 along the entire length of the portion 43. That is to say, without the thin portion 44 the bar 30 may be inserted into the bore 32 so as to move the membrane 42 away from the bore so that the membrane 42 would buckle outwardly in an arc terminating at each end of the membrane 42 so as not to be in frictional engagement with the bar 30 along the entire length thereof. However, by providing the thin portion 44, the membrane portion 43 does not buckle since such buckling is taken up by the thin portion 44, as indicated in FIGURE 3.

In practice it has been found preferable to make the end fitting out of an acetal resin with the membrane portion 43 being approximately .0020 of an inch thick, the second thin portion 44 approximately .0010 of an inch thick, and the membrane 42 extending approximately .0010 of an inch into the bore 32.

The invention, therefore, provides a remote control assembly comprising a guide 12 including a flexible conduit 14 and the end fitting 16 to movably support a motion transmitting core element 18. A resilient friction means 40 taking the form of a resilient membrane 42 is formed integrally with the end fitting 16 of the guide 12 so that the membrane 42 extends at least partially into the bore 32 to bear against the bar 30 of the core element 18 for providing a predetermined amount of resistance to the movement of the core element 18. As will be evident to those of ordinary skill in the art, the tolerances of the bore 32 need not be as critical in the instant invention as those in the prior art devices since the membrane 42 extends into the bore 32 to engage the bar 30. And as the membrane 42 wears, the inherent resiliency of the membrane 42 will urge the membrane 42 into the bore to compensate for the wear thereof.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:
1. A remote control assembly comprising; a guide adapted to support a movable core element therein, and a resilient membrane formed integrally with a portion of said guide for providing a predetermined frictional resistance to the movement of the core element to be supported by the guide, said membrane having a first thickness along a first portion thereof and a second thickness along the remaining second portion thereof, said first thickness being greater than said second thickness.

2. A remote control assembly comprising a guide made of organic polymeric material and having a bore therethrough, a core element movably disposed in said bore, and a resilient friction membrane formed integrally with a portion of said guide and extending at least partially into said bore to hold said core element between said bore and said resilient friction membrane to provide a predetermined frictional resistance to the movement of said core element whereby a predetermined force must be applied to said core element in order to move said core element relative to said guide.

3. A remote control assembly as set forth in claim 2 wherein said membrane has a first thickness along a first portion thereof and a second thickness along the remaining second portion thereof, said first thickness being greater than said second thickness.

4. A remote control assembly comprising; a guide made of organic polymeric material and having a bore therethrough, a core element movably disposed in said bore, and a friction membrane formed integrally with a portion of said guide and extending at least partially into said bore to bear against said core element for providing a predetermined amount of frictional resistance to the movement of said core element.

5. A remote control assembly as set forth in claim 4 wherein said membrane has a first thickness along a first portion thereof and a second thickness along the remaining second portion thereof, said first thickness being greater than said second thickness.

6. A remote control assembly comprising; a guide made of organic polymeric material and having a bore therethrough, and a core element movably disposed in said bore, said guide having a portion with a resilient membrane formed integrally therewith, said resilient membrane disposed so as to extend into said bore to bear against said core element so that said core element is held against movement between said bore and said resilient membrane until a predetermined force is applied to said core element to move said core element.

7. A remote control assembly as set forth in claim 6 wherein said resilient membrane has a first thickness along a first portion thereof and a second thickness along the remaining second portion thereof, said first thickness being greater than said second thickness.

8. A remote control assembly comprising: a conduit; an end fitting having a bore therethrough secured to a first end of said conduit; and a core element extending through said conduit and said bore in said end fitting; said end fitting being formed so as to have a resilient membrane integral therewith and normally extending into said bore for providing a predetermined amount of resistance to the movement of said core element.

9. A remote control assembly as set forth in claim 8 wherein said membrane has a first thickness along a first portion thereof and a second thickness along the remaining second portion thereof, said first thickness being greater than said second thickness.

10. A remote control assembly comprising; a conduit; an end fitting having a bore therethrough secured to a first end of said conduit and adapted to be attached to a support structure; and a core element extending through said conduit and said bore in said end fitting; said end fitting having a thin resilient membrane formed integral therewth and disposed to traverse at least a portion of said bore so that said core element is frictionally held against movement between said bore and said resilient membrane until a predetermined force is applied to said core element to move said core element.

11. A remote control assembly as set forth in claim 10 wherein said membrane has a first thickness along a first portion thereof and a second thickness along the remaining second portion thereof, said first thickness being greater than said second thickness.

12. A remote control assembly comprising: a conduit; an end fitting having a bore therethrough secured to a first end of said conduit and adapted to be attached to a support structure; a core element extending through said conduit and said bore in said end fitting; said core element having a first end extending within said end fitting; and means attached to said first end of said core element and slidably supported in said bore in said end fitting for moving said core element; said end fitting having a resilient membrane formed integrally therewith and normally extending at least partially into said bore for bearing against said means attached to said first end of said core element to provide a predetermined amount of resistance to the movement of said core element.

13. A remote control assembly as set forth in claim 12 wherein said membrane has a first thickness along a first portion thereof and a second thickness along the remaining second portion thereof, said first thickness being greater than said second thickness.

14. A remote control assembly comprising: a conduit; an end fitting having a bore therethrough secured to a first end of said conduit and adapted to be attached to a support structure; a core element extending through said conduit and said bore in said end fitting; said core element having a first end extending from the second end of said conduit with means for attachment to an element to be controlled; said core element having a second end extending within said end fitting; means attached to said second end of said core element for moving said core element including a bar to match said first bore in said end fitting so that said bar is movably supported in said end fitting; and a thin resilient membrane formed integrally with said end fitting to bear against said bar so that said bar is frictionally held against movement between said bore and said resilient membrane until a predetermined force is applied to said bar to move said bar thereby providing a predetermined amount of resistance to the movement of said core element.

15. The remote control assembly as set forth in claim 14 wherein said membrane has a first thickness along a first portion thereof and a second thickness along the remaining second portion thereof, said first thickness being greater than said second thickness whereby said second thickness may buckle to allow longitudinal movement of said first portion as said membrane is urged radially outward from said bore by said bar so that said first portion maintains sliding contact with said bar along the entire length of said first portion.

16. An end fitting for a remote control assembly of the type adapted to support a movable core element therein, said end fitting comprising; a resilient membrane formed integrally with said end fitting adjacent a bore extending therethrough, said resilient membrane disposed so as to extend a predetermined degree into said bore in the unstressed condition so that when a core element is positioned in said bore said resilient membrane will be moved radially outward and said core element is held against movement between said bore and said resilient membrane until a predetermined force is applied to said core element to move said core element.

17. An end fitting as set forth in claim 16 wherein said resilient membrane has a first thickness along a first portion thereof and a second thickness along the remaining second portion thereof, said first thickness being greater than said second thickness whereby a core element may be disposed in said bore to move said membrane radially outward as said second portion buckles to compensate for longitudinal movement of said first portion so that said first portion remains in sliding contact with said core element along the entire length of said first portion.

References Cited

UNITED STATES PATENTS

| | | | |
|---|---|---|---|
| 1,454,238 | 5/1923 | Kaufman | 74—503 |
| 1,905,664 | 4/1933 | Weatherhead | 74—502 X |
| 2,229,390 | 1/1941 | Roemer | 188—67 X |
| 2,775,869 | 1/1957 | Pointer. | |
| 2,972,263 | 2/1961 | Hines | 74—502 X |
| 3,139,768 | 7/1964 | Biesecker. | |
| 3,208,300 | 9/1965 | Morse | 74—501 X |
| 3,223,201 | 12/1965 | Waner | 74—501 X |
| 3,289,491 | 12/1966 | Conrad | 74—501 |
| 3,302,479 | 2/1967 | Conrad | 74—501 |

FOREIGN PATENTS

| | | |
|---|---|---|
| 729,722 | 5/1932 | France. |

OTHER REFERENCES

German printed application 1,037,800, December 1955.

FRED C. MATTERN, JR., *Primary Examiner.*

C. F. GREEN, *Assistant Examiner.*